(12) United States Patent
Bivens et al.

(10) Patent No.: US 6,189,662 B1
(45) Date of Patent: Feb. 20, 2001

(54) ADJUSTABLE DAMPER

(75) Inventors: Steven L. Bivens, Kankakee; Eric Parker, Chicago, both of IL (US)

(73) Assignee: Illinois Tool Works Inc., Glenview, IL (US)

( * ) Notice: Under 35 U.S.C. 154(b), the term of this patent shall be extended for 0 days.

(21) Appl. No.: 09/153,276

(22) Filed: Sep. 14, 1998

(51) Int. Cl.$^7$ ........................................................ F16F 9/48
(52) U.S. Cl. ............................................................. 188/288
(58) Field of Search .................................. 188/266, 288, 188/301, 322.15; 267/64.15, 64.11, 113, 118, 120, 124, 126; 16/49, 66, 84

(56) References Cited

U.S. PATENT DOCUMENTS

| | | | |
|---|---|---|---|
| 3,722,920 | * | 3/1973 | Reese ................................ 280/446 B |
| 4,596,416 | | 6/1986 | Muller . |
| 4,630,857 | | 12/1986 | Zweiniger et al. . |
| 4,725,089 | | 2/1988 | Langer . |
| 4,786,098 | | 11/1988 | Jobmann et al. . |
| 4,886,311 | | 12/1989 | Trube et al. . |
| 5,104,098 | * | 4/1992 | Kaneko ............................. 267/64.11 |
| 5,190,314 | | 3/1993 | Takasugi . |
| 5,197,775 | | 3/1993 | Reeber . |
| 5,207,471 | | 5/1993 | Mutschler et al. . |
| 5,275,456 | | 1/1994 | Ishii et al. . |
| 5,289,962 | | 3/1994 | Tull et al. . |
| 5,333,845 | | 8/1994 | Seiichi . |

* cited by examiner

Primary Examiner—Matthew C. Graham
Assistant Examiner—C. T. Bartz
(74) Attorney, Agent, or Firm—Pitney, Hardin, Kipp & Szuch LLP

(57) ABSTRACT

The damper includes a cylindrical housing with a cylindrical passageway formed therewithin. A piston traverses the cylindrical passageway. A monofilament element is integral with the piston on a first end and includes a plurality of molded annular rings on a second end. The molded annular rings serve as a male element for engaging a female clamping element with internal serrations. This allows for the female clamping element to be positioned along an adjustable distance with respect to the male element. The portion of the cylindrical passageway through which the piston traverses when the damper is in its retracted position has a reduced diameter.

14 Claims, 3 Drawing Sheets

ADJUSTABLE DAMPER

BACKGROUND OF INVENTION

1. Field of Invention

This invention pertains to a damper, such as is used with a glove box of an automobile. The damper includes an adjustable clamp and further includes a damper housing forming a cylinder with an area of decreased internal diameter.

2. Description of the Prior Art

The use of an air cylinder damper device in combination with a monofilament element biased by a spring for use with a storage cabinet, such as an automobile glove box, is well known as illustrated by U.S. Pat. No. 5,333,845, entitled "Damper Device" and issued to Seiichi on Aug. 2, 1994. An air damper is likewise illustrated in U.S. Pat. No. 5,104,098 entitled "Cylinder Type Air Damper" and issued to Kaneko on Apr. 14, 1992.

However, the prior art designs have several disadvantages. Firstly, the prior art designs frequently require secondary fasteners to attach the damper to the panel. Secondly, the prior art designs have frequently utilized a monofilament element with loops formed at each end. Metal clasps are pinched onto the monofilament element at each end to form loops. One loop is attached to the piston and the other loop is attached to the glove box. However, this design would fail if the clasps became loose. Additionally, once the loops are created on the monofilament element, the monofilament element distance is set and cannot be changed. Thirdly, the prior art designs typically have an initial jump when the glove box is released.

OBJECTS AND SUMMARY OF THE INVENTION

It is therefore an object of this invention to provide a damper, such as for automobile glove box applications, which can be installed with minimal or no secondary fasteners.

It is therefore a further object of this invention to provide a damper, such as for automobile glove box applications, which has an adjustable expanse.

It is therefore a still further object of this invention to provide a damper, such as for automobile glove box applications, which provides a reliable engagement between the piston, the monofilament element and the door, such as that of an automobile glove box.

It is therefore a still further object of this invention to provide a damper, such as for automobile glove box applications, which minimizes or eliminates the initial jump when the door, such as that of an automobile glove box, is initially opened.

These and other objects are attained by providing an air damper with a housing, a cap, discs, an integral plastic monofilament element/piston, and a spring. The housing forms a cylinder through which the piston travels and further includes an integral fastener with opposed scythe-like hook structures to allow the housing to be "rocked-in" the panel without the use of separate secondary fasteners.

The piston and the monofilament element are molded as a single piece. This eliminates any need for a secondary monofilament element with loops and clasps which may fail. The open end of the molded monofilament element has molded annular rings which allow an adjustable fastener to be attached to the open end. This adjustable fastener allows the length at which the monofilament element/piston attaches to the glove box to be adjustable. Therefore, one molded monofilament element/piston can be adjusted to various lengths, as appropriate for the application.

The diameter of the cylinder formed within the damper housing is decreased near the closed end of the housing to increase friction between the piston discs and the housing when the air damper is in a closed or nearly closed position. This additional friction eliminates the initial jump otherwise frequently associated with air dampers.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
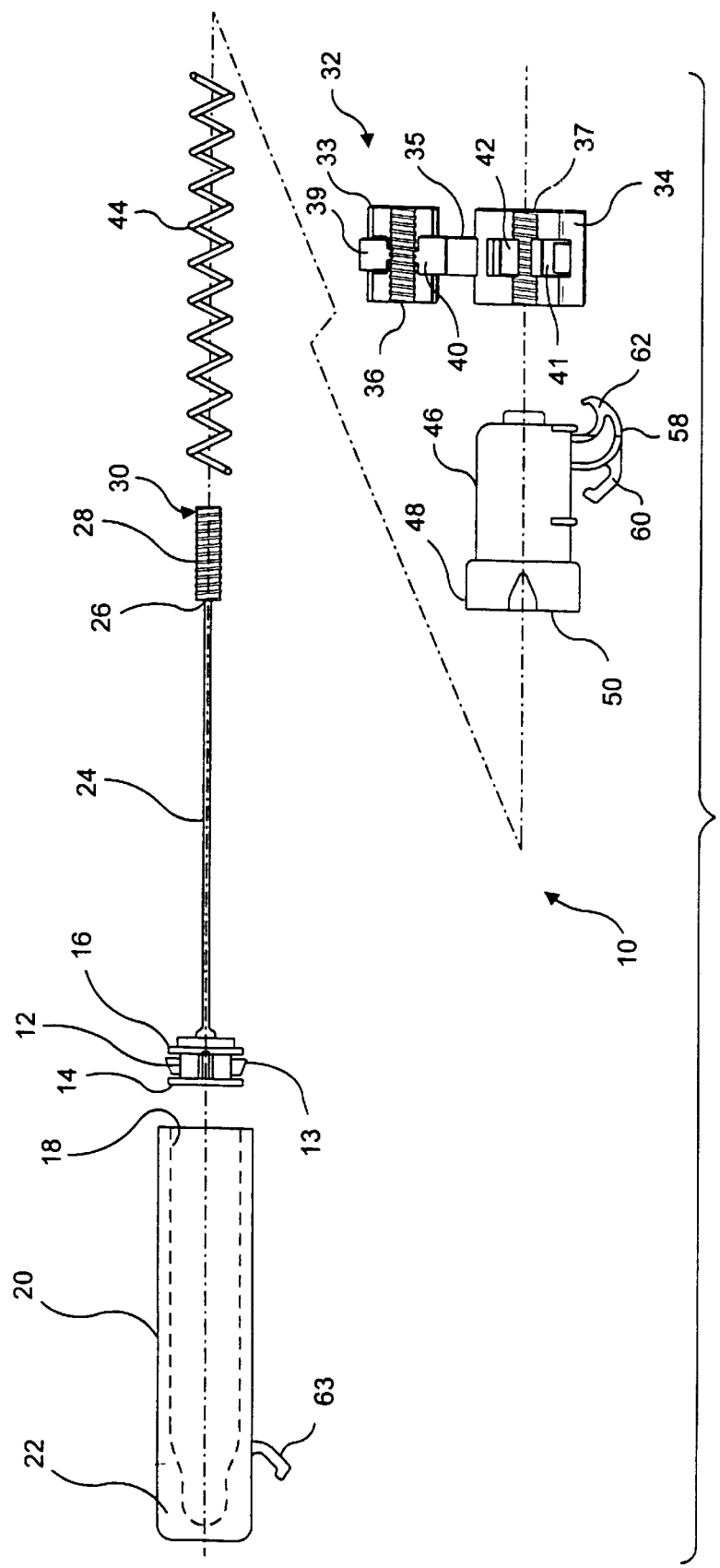
FIG. 1 is an exploded view, partially in phantom, of the damper of present invention.
Figure 5:
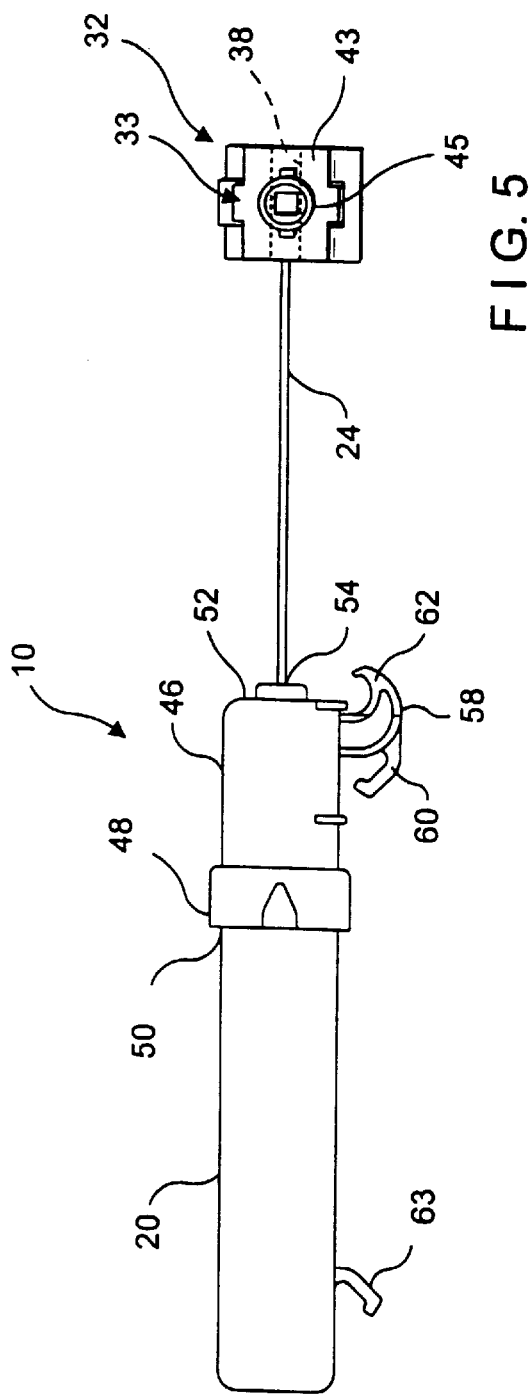
FIG. 5 is a side plan view of the damper of the present invention with monofilament element extended.
Figure 6:
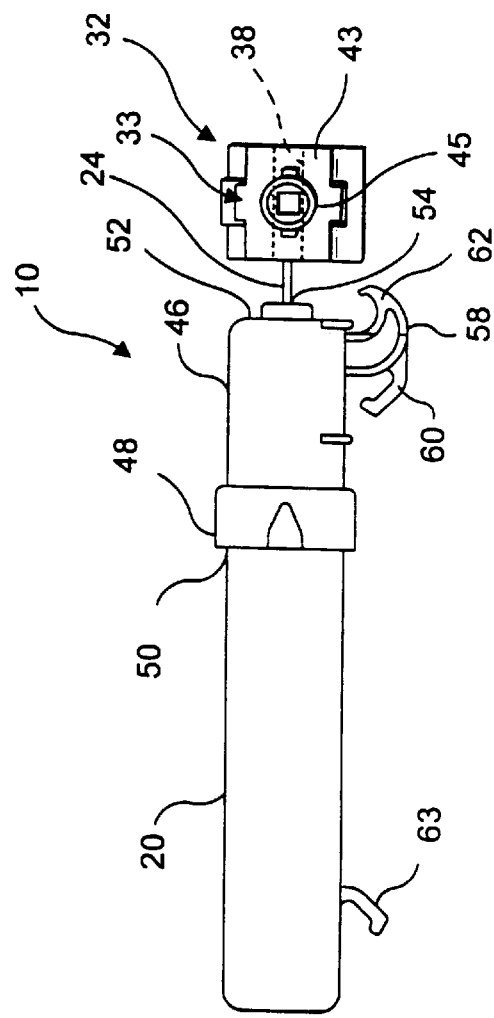
FIG. 6 is a side plan view of the damper of the present invention with the monofilament element retracted.

Referring now to the drawings in detail wherein like numerals refer to like elements throughout the several views, one sees that FIG. 1 is an exploded view, partially in phantom, of the damper 10 of the present invention. Damper 10 includes cylindrical piston 12 with circular peripheral discs 14, 16 which engage cylinder passageway 18 of lower damper housing 20. Lip seal 13 extends from cylindrical piston 12. Piston 12 travels within cylinder passageway 18 as damper 10 is extended or retracted as shown in FIGS. 5 and 6, respectively. As shown in phantom in FIG. 1, cylinder passageway 18 of lower damper housing 20 includes a lower portion 22 of reduced diameter, this reduction of diameter being exaggerated in FIG. 1. The reduction of diameter of lower portion 22 provides a fit of increased tightness between piston 12 and cylinder passageway 18 when piston 12 is fully inserted into cylinder passageway 18 as in the retracted position shown in FIG. 6. This eliminates or minimizes the initial jump undamped movement or which is associated with air dampers.

Figure 4:
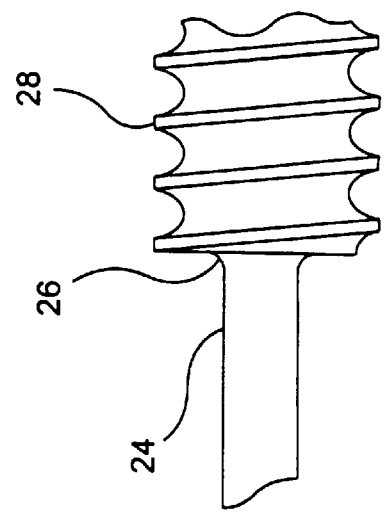
FIG. 4 is a slide plan view of the annular rings of the monofilament element the present invention.
Figure 2:
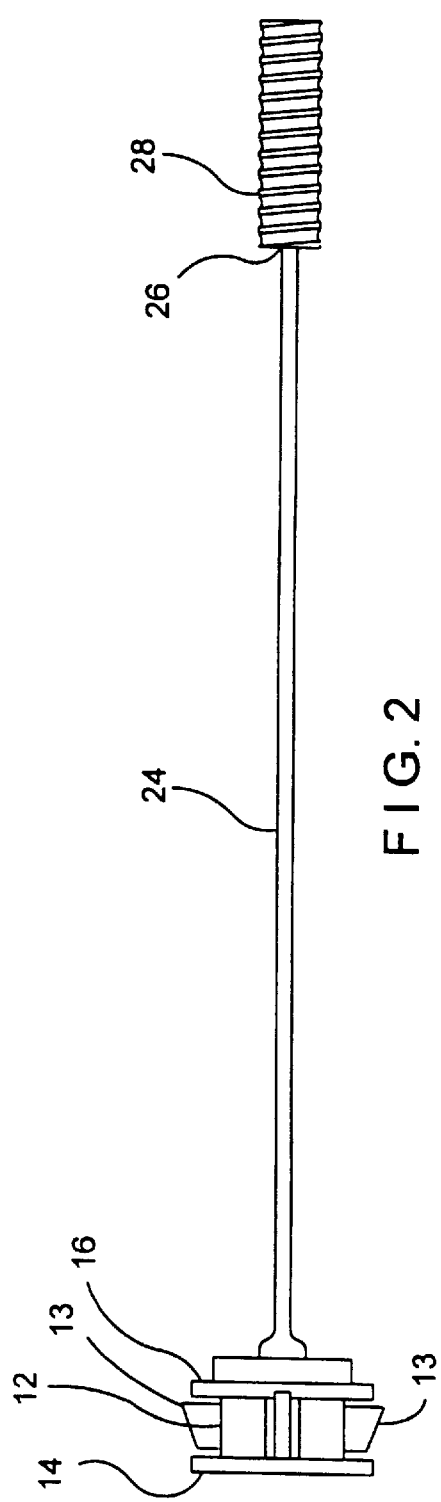
FIG. 2 is a slide plan view of the integral piston and monofilament element of the present invention.
Figure 3:
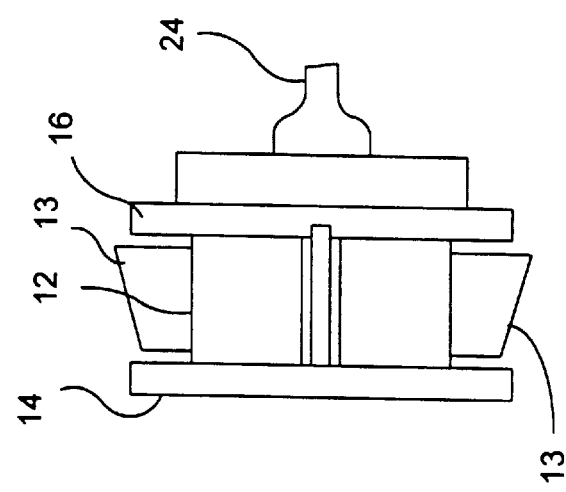
FIG. 3 is slide plan view of the piston of the present invention.

As shown in FIGS. 2 and 3, piston 12 is molded integrally with monofilament element 24. As shown in FIGS. 2 and 4, the end 26 of monofilament element 24 opposite from piston 12 includes a series of enlarged molded annular rings 28 which form a male element 30 to attach to a corresponding female clamping element 32. Female clamping element 32 is a clamshell-type configuration with two clamping portions 33, 34 attached by a living hinge 35, each clamping portion 33, 34 including a longitudinally divided complementary half 36, 37 of internally serrated aperture 38. Clamping portion 33 includes inwardly extending detent legs 39, 40 laterally adjacent to complementary half 36 of internally serrated aperture 38. Detent legs 39, 40 engage detent apertures 41, 42 of clamping portion 34 when clamping portions 33, 34 are in the closed position thereby forming internally serrated aperture 38 which engages male element 30. The outward side 43 of clamping portion 33 includes outwardly extending cylindrical detent element 45. Cylindrical detent element 45 is typically used to engage a cylindrical aperture of a structural device, such as the door of glovebox of an automobile (not shown) and may be replaced with many other fastening elements as would be known to a person skilled in the art.

As shown in FIG. 1, coil spring 44 is wrapped around monofilament element 24. A first end of coil spring 44 abuts piston 12 and a second end of coil spring 44 abuts upper damper housing 46 thereby urging piston 12 and monofilament element 24 toward a retracted position as illustrated in FIG. 6.

Upper damper housing 46 includes ring 48 on open end 50 thereof which snap fits onto lower damper housing 20. Upper damper housing 46 further includes closed end 52 with central aperture 54 through which monofilament element 24 reciprocatingly passes. Central aperture 54 is formed so that a longitudinal axis of damper 10 passes through central aperture 54. The cylindrical wall 56 of upper damper housing 46 further includes fastener 58 with opposed scythe-like hooks 60, 62. Lower damper housing 20 likewise includes fastener 63. The configuration of fastener 58 allows the damper 10 to be installed by a "rockingin" motion with the subsequent alignment and engagement of fastener 63 without the necessity of secondary fasteners.

To use damper 10, the installer typically chooses a female clamping element 32 of the appropriate shape and size and attaches element 32 to male element 30 of monofilament element 24 at the position appropriate for the application. The installer then attaches fastener 58 to the appropriate door or panel (not shown) by a "rocking-in" motion and similarly attaches outwardly extending cylindrical detent element 45 to the appropriate door or panel (not shown). The choice of the dimensions of the particular elements and the adjustment thereof should provide for piston 12 to be urged into lower portion 22 of reduced diameter of cylinder passageway 18 when the associated door (not shown) is closed, and to allow piston 12 to traverse cylinder passageway 18 during the opening of the associated door. The sequence of steps can be varied according to the application and the preferences of the user.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A damper including:
   a housing with a cylindrical passageway formed therewithin, further including an aperture in said housing leading to said cylindrical passageway;
   a piston traversing said cylindrical passageway;
   a monofilament element including a first end and a second end, said first end attached to a first attachment element and said second end attached to said piston, said monofilament element reciprocatingly passing through said aperture;
   an engagement element including a second attachment element, said second attachment element attaching to said first attachment element wherein said first attachment element attaches to said second attachment element throughout a range of positions thereby providing an adjustable position of said engagement element with respect to said monofilament element.

2. The damper of claim 1 wherein one of said first and second attachment elements is a male element with a plurality of annular rings and another of said first and second attachment elements is a female element with internal serrations, said annular rings engaging said internal serrations.

3. The damper of claim 2 wherein said engagement element further includes a third attachment element.

4. The damper of claim 3 wherein said engagement element has two clamping elements hinged to each other, each clamping element including longitudinally divided complementary halves of an aperture upon which internal serrations are formed.

5. The damper of claim 4 wherein said monofilament element is integrally formed with said piston.

6. The damper of claim 5 wherein said monofilament element and said piston are formed of plastic.

7. The damper of claim 6 further including a coil spring through which said monofilament element passes.

8. The damper of claim 7 wherein said coil spring includes a first end and a second end, said first end abutting said piston and said second end abutting an end of said cylindrical passageway.

9. The damper of claim 8 wherein said end of said cylindrical passageway abutted by said second end of said coil spring is proximate to said aperture.

10. The damper of claim 1 wherein said piston traverses a first portion of said cylindrical passageway when said monofilament element is in a relatively retracted position and said piston traverses a second portion of said cylindrical passageway when said monofilament element is in a relatively extended position, and wherein a diameter of said first portion of said cylindrical passageway is reduced from a diameter of said second portion of said cylindrical passageway.

11. The damper of claim 10 wherein said reduced diameter of said first portion of said cylindrical passageway frictionally engages said piston to minimize any initial jump of the damper.

12. The damper of claim 11 wherein a longitudinal axis of said housing passes through said aperture and wherein said aperture is formed proximate to said second portion of said cylindrical passageway.

13. The damper of claim 12 wherein said housing is formed by a first part and a second part, said first part joining said second part along a circumferential section of said housing.

14. The damper of claim 13 wherein said first part of said housing snap fits to said second part of said housing.

* * * * *